United States Patent
Kausley et al.

(10) Patent No.: US 10,654,728 B2
(45) Date of Patent: May 19, 2020

(54) PROCESS AND APPARATUS FOR PURIFICATION OF WATER

(71) Applicant: Tata Consultancy Services Limited, Mumbai (IN)

(72) Inventors: Shankar Balajirao Kausley, Pune (IN); Chetan Premkumar Malhotra, Pune (IN); Dilshad Ahmad, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 279 days.

(21) Appl. No.: 15/125,937

(22) PCT Filed: Mar. 7, 2015

(86) PCT No.: PCT/IB2015/051674
§ 371 (c)(1),
(2) Date: Sep. 13, 2016

(87) PCT Pub. No.: WO2015/136424
PCT Pub. Date: Sep. 17, 2015

(65) Prior Publication Data
US 2018/0170772 A1    Jun. 21, 2018

(30) Foreign Application Priority Data
Mar. 14, 2014 (IN) ............................ 854/MUM/2014

(51) Int. Cl.
*C02F 1/28* (2006.01)
*B01J 20/06* (2006.01)
(Continued)

(52) U.S. Cl.
CPC ............... *C02F 1/281* (2013.01); *B01D 15/18* (2013.01); *B01J 20/06* (2013.01);
(Continued)

(58) Field of Classification Search
CPC .. C02F 1/003; C02F 1/281; C02F 9/00; C02F 9/005; C02F 2101/103; C02F 2307/04;
(Continued)

(56) References Cited

U.S. PATENT DOCUMENTS 2,785,803 A * 3/1957 Young ................... B01D 29/01
                                                210/282
6,138,703 A * 10/2000 Ferguson .............. B01F 1/0027
                                                137/1
(Continued)

FOREIGN PATENT DOCUMENTS

WO    WO-2011/013142         2/2011
WO    WO-2013093944 A2 *   6/2013 ............ B01F 1/0033

OTHER PUBLICATIONS

Pal, BN, Granular Ferric Hydroxide for Elimination of Arsenic from Drinking Water, Jan. 2001, A compilation of papers presented at the International Workshop on Technologies for Arsenic Removal from Drinking Water, pp. 59-68.*

(Continued)

*Primary Examiner* — Matthew O Savage
(74) *Attorney, Agent, or Firm* — Finnegan, Henderson, Farabow, Garrett & Dunner LLP

(57) ABSTRACT

The present disclosure relates to a process for the purification of water. The process includes leading water laden with microorganisms and arsenic through an arsenic adsorption media followed by treating the resultant arsenic deficient water with a disinfectant releasing system to obtain water deficient of arsenic and viable microorganisms. The present disclosure also provides an apparatus for the purification of water using the afore-stated process.

12 Claims, 6 Drawing Sheets

(51) Int. Cl.
*C01G 49/02* (2006.01)
*C02F 1/68* (2006.01)
*C02F 1/76* (2006.01)
*C02F 9/00* (2006.01)
*B01J 20/30* (2006.01)
*B01J 20/28* (2006.01)
*C02F 1/00* (2006.01)
*B01D 15/18* (2006.01)
*C02F 101/10* (2006.01)
*C02F 101/20* (2006.01)

(52) U.S. Cl.
CPC ... *B01J 20/28004* (2013.01); *B01J 20/28057* (2013.01); *B01J 20/28059* (2013.01); *B01J 20/28061* (2013.01); *B01J 20/3021* (2013.01); *B01J 20/3078* (2013.01); *B01J 20/3085* (2013.01); *C01G 49/02* (2013.01); *C02F 1/003* (2013.01); *C02F 1/688* (2013.01); *C02F 1/76* (2013.01); *C02F 9/00* (2013.01); *C02F 9/005* (2013.01); *B01J 2220/4806* (2013.01); *B01J 2220/56* (2013.01); *C02F 1/001* (2013.01); *C02F 2101/103* (2013.01); *C02F 2101/20* (2013.01); *C02F 2209/40* (2013.01); *C02F 2209/44* (2013.01); *C02F 2209/445* (2013.01); *C02F 2303/04* (2013.01); *C02F 2307/04* (2013.01); *C02F 2307/10* (2013.01)

(58) Field of Classification Search
CPC .. C02F 2307/101; C02F 2307/10; C02F 1/76; C02F 1/688; C02F 2209/445; C02F 2209/44; C02F 2101/20; C02F 2303/04; C02F 2209/40; C02F 1/001; B01J 20/06; B01J 20/28057; B01J 20/3085; B01J 20/28061; B01J 20/28059; B01J 20/28004; B01J 20/3078; B01J 20/3021; B01J 2220/56; B01J 2220/4806; B01D 15/18; C01G 49/02

See application file for complete search history.

(56) References Cited

U.S. PATENT DOCUMENTS

| | | | |
|---|---|---|---|
| 6,274,045 B1 * | 8/2001 | Kreisler | C02F 1/54 210/710 |
| 2003/0209495 A1 | 11/2003 | Schlegel | |
| 2004/0108275 A1 * | 6/2004 | Shaniuk | B01J 20/0229 210/688 |
| 2005/0029198 A1 | 2/2005 | Tepper et al. | |
| 2005/0103721 A1 * | 5/2005 | Fritze | C02F 1/004 210/744 |
| 2008/0011686 A1 | 1/2008 | Banavalie et al. | |
| 2008/0197081 A1 | 8/2008 | Gadgil | |
| 2008/0257823 A1 * | 10/2008 | Martikainen | B01J 20/06 210/660 |
| 2012/0125203 A1 | 5/2012 | Fitzgerald et al. | |

OTHER PUBLICATIONS

Garelick et al, Remediation Technologies for Arsenic Contaminated Drinking Waters, Jan. 2005, J Soils and Sediments, Volumne 5, Issue 3, pp. 182-190.*

International Search Report dated Jun. 29, 2015, issued in counterpart International Application No. PCT/IB2015/051674; 2 pages.

* cited by examiner

PROCESS AND APPARATUS FOR PURIFICATION OF WATER

PRIORITY CLAIM

This U.S. patent application claims priority to: India Application No. 854/MUM/2014 filed on 14 Mar. 2014, and PCT application number PCT/IB2015/051674 filed on 7 Mar. 2015. The entire contents of the aforementioned application are incorporated herein by reference.

TECHNICAL FIELD

The present disclosure relates to purification of water. More particularly, the present disclosure relates to a process for the purification of water.

BACKGROUND

Water available from various sources is often contaminated with suspended solids, microorganisms and toxic chemicals. Consumption of water contaminated with microbial contaminants such as bacteria, viruses and cysts is one of the major causes of various water-borne diseases such as cholera, typhoid and diarrhea. Similarly, consumption of water contaminated with toxic chemicals such as arsenic causes various health hazards such as hyperkeratosis of the hands and palms, black-foot disease and skin, lung, liver, bladder and kidney cancer. Significantly, arsenic has been identified as one of the major water contaminants across the world by countries such as Bangladesh, India, United States of America, South America, China, Taiwan and Thailand. It is estimated that worldwide about 137 million people are exposed to arsenic and subsequently its toxicity. West Bengal, Jharkhand, Bihar and Uttar Pradesh are the Indian states having a very high exposure to arsenic induced toxicity and associated health concerns.

This problem is more aggravated in developing countries where most of the population lives in rural areas and is deprived of purified and safe drinking water. In order to avoid such health hazards caused due to microbial and arsenic contamination, water used for drinking and cooking purposes should be made free from these contaminants.

Different interventions have been adopted in the state of the art, which include centralized water treatment plants, community water treatment units and point-of-use (POU) treatment units. However, these state of the art methods are associated with various disadvantages which are described herein below:

a) Centralized water treatment plants require large capital and involve large operating costs. Hence, these methods are available only in urban areas and are not feasible for deployment in remote rural areas.

b) Community treatment units are also not feasible for long term deployment, since these units demand high maintenance and skilled manpower.

c) The point of use (POU) purifiers based on chemical disinfection, ultraviolet radiation treatment and membrane filtration are able to inactivate or remove microbial contaminants but are not effective in reducing arsenic contamination in water.

d) These POU purifiers are priced by targeting relatively affluent urban buyers and are not affordable to most low-income and rural households.

e) The POU purifiers that are based on reverse osmosis technology are expensive and require continuous supply of piped water and electricity for their operation, and are thus, beyond the reach of rural population.

f) The state of the art methods involve the use of continuous supply of water.

g) The state of the art methods involve the use of electricity.

h) The state of the art methods require skilled manpower.

It is evident that the state of the art processes are inappropriate for widespread use in a majority of developing countries since these processes are expensive and require continuous supply of water. Further, these processes are not able to simultaneously reduce arsenic and microbial contamination in water. Still further, these processes require electricity and skilled manpower for their proper functioning.

SUMMARY

Embodiments of the present disclosure present technological improvements as solutions to one or more of the above-mentioned technical problems recognized by the inventors in conventional systems. For example, in one embodiment, a The present disclosure provides a process for removing arsenic and inactivating microorganisms from arsenic and microorganisms laden water; said process comprising steps of removing arsenic from said water by leading said water, against gravity, through a bed of granulated arsenic removal media comprising iron compounds in an amount ranging from 30 to 70% of the total mass of the bed, said granulated media having particle size ranging from 400 to 1000 micrometers and surface area ranging from 50 to 400 $m^2/g$, for a time period ranging from 5 to 30 minutes, to obtain water with reduced arsenic content; and inactivating microorganisms in the water with reduced arsenic content by leading the water with reduced arsenic content through a disinfectant releasing system which releases at least one disinfectant in the water with reduced arsenic content at a rate ranging from 0.1 to 1 mg/liter to cause depletion of viable microbial content therein, to provide water deficient of arsenic and microorganisms, wherein said disinfectant is chlorine.

In accordance with the process of the present disclosure, the granulated arsenic removal media is prepared by a process comprising steps of simultaneously adding ferric chloride in an amount ranging from 5 to 30% w/v and sodium hydroxide in an amount ranging from 5 to 40% w/v, in water, at a pH ranging from 6.5 to 7 to obtain a slurry; allowing said slurry to settle for a time period ranging from 1 to 8 hours to obtain a residue and a supernatant; separating said supernatant from said residue by at least one method selected from the group consisting of decantation and vacuum filtration to obtain a cake; drying said cake at a temperature ranging from 60 to 110° C. for a time period ranging from 8 to 24 hours to obtain a dried cake; converting said dried cake to granulated matter; and sieving said granulated matter to obtain the sized granulated arsenic removal media having particle size ranging from 400 to 1000 micrometers and surface area ranging from 50 to 400 $m^2/g$. In accordance with the process of the present disclosure, the bed of granulated arsenic removal media is prepared by holding the granulated arsenic removal media, prepared in accordance with afore-stated process, in between a coarse mesh and a cloth.

In accordance with the process of the present disclosure, the iron compound is at least one selected from the group consisting of iron oxides, iron hydroxides and ironoxyhydroxides.

In accordance with the process of the present disclosure, the iron compound is at least one selected from the group consisting of ferric hydroxide and ferrous hydroxide.

In accordance with the process of the present disclosure, the disinfectant releasing system is prepared by mounting at least one spring loaded disinfectant releasing tablet in a chamber, biasing said disinfectant releasing tablet in a first compartment against a diffusion barrier to release at least one fluidized disinfectant into the water with reduced arsenic content, passing through a second compartment.

In accordance with the process of the present disclosure, the disinfectant releasing tablet comprises at least one disinfectant releasing compound selected from the group consisting of calcium hypochlorite, sodium dichloroisocyanurate, trichloroisocyanuric acid and N-chloro-p-toluenesulfonamide sodium salt (Chloramine T), in an amount ranging from 50 to 100% of the total mass of the tablet and at least one additive selected from the group consisting of vehicle, buffer, diluent, binder, glidant, lubricant, disintegrant, wetting agent, stabilizer, flavoring agent, sweetening agent, coating agent, preservative, dispersing agent, oil, wax, emulsifier, surfactant, gelling agent, opacifier, humectant, antioxidant, suspending agent, thickening agent, antifoaming agent and adsorbent, in an amount ranging from 0 to 50% of the total mass of the tablet.

The process of the present disclosure includes the step of leading the arsenic and microorganisms laden water through a filtration unit before leading said water through the bed of granulated arsenic removal media.

In accordance with the process of the present disclosure, the flow of the water with reduced arsenic content that is allowed to enter the disinfectant releasing system and the contact time between said arsenic and microorganisms laden water and said bed of granulated arsenic removal media is regulated by means of a nozzle.

The process of the present disclosure includes the step of monitoring the volume of water deficient of arsenic and microorganisms.

In another embodiment, the present disclosure further provides an apparatus for removing arsenic and inactivating microorganisms from arsenic and microorganisms laden water; the apparatus comprising: a first chamber wherein the first chamber comprises a first inlet adapted to receive said arsenic and microorganisms laden water; a coarse mesh, having mesh size ranging from 20 mesh (841 micrometer) to 60 mesh (250 micrometer), adapted to permit the passage of said water received from said first inlet there through; a bed of granulated arsenic removal media supported by said coarse mesh adapted to allow the passage of said arsenic and microorganisms laden water and adsorb the arsenic present in said water to obtain water with reduced arsenic content; a first outlet adapted to receive the water with reduced arsenic content; and a cloth, having pore size ranging from 3 micrometer to 20 micrometer, fitted operatively over said bed and between said bed and said first outlet adapted to trap fine particles in the water with reduced arsenic content and to permit passage of the water with reduced arsenic content there through to said first outlet;

The apparatus further comprises a second chamber comprising a first compartment and a second compartment operatively separated from said first compartment by a diffusion barrier, said first compartment being located operatively over the second compartment; said second chamber comprising: a second inlet provided to said second compartment adapted to receive the water with reduced arsenic content from said first outlet; at least one disinfectant releasing tablet provided in said first compartment adapted to release at least one disinfectant when moistened; a diffusion barrier adapted to regulate the diffusion of the released disinfectant; at least one spring provided in the first compartment adapted to bias said tablet(s) against said diffusion barrier; and a second outlet provided to said second compartment adapted to receive the water deficient of arsenic and containing diffused disinfectant; and a conduit configured to communicate liquid from said first outlet to said second inlet, optionally comprising at least one nozzle for regulating the contact time between said arsenic and microorganisms laden water and said bed of granulated arsenic removal media.

The apparatus of the present disclosure further includes at least one filtration unit.

The apparatus of the present disclosure even further includes a life indicator to display the remaining life of the media.

Typically, at least one dimension of the disinfectant releasing tablets is used to indicate the remaining life of the apparatus.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Purification of water is an age old exercise carried out in every other house hold in order to render water useful for applications such as drinking, cooking and storage. However, contaminants such as microorganisms and chemicals such as arsenic are tricky to remove in domestic set ups with easy to use, cost-effective and electricity free device. Both the domestic and the prior art techniques, fall short of providing efficient as well as cost effective means for water purification. The present disclosure, therefore, provides a process for removing arsenic and inactivating microorganisms from arsenic and microorganisms laden water which reduces the draw backs associated with the prior art processes.

Figure 1:
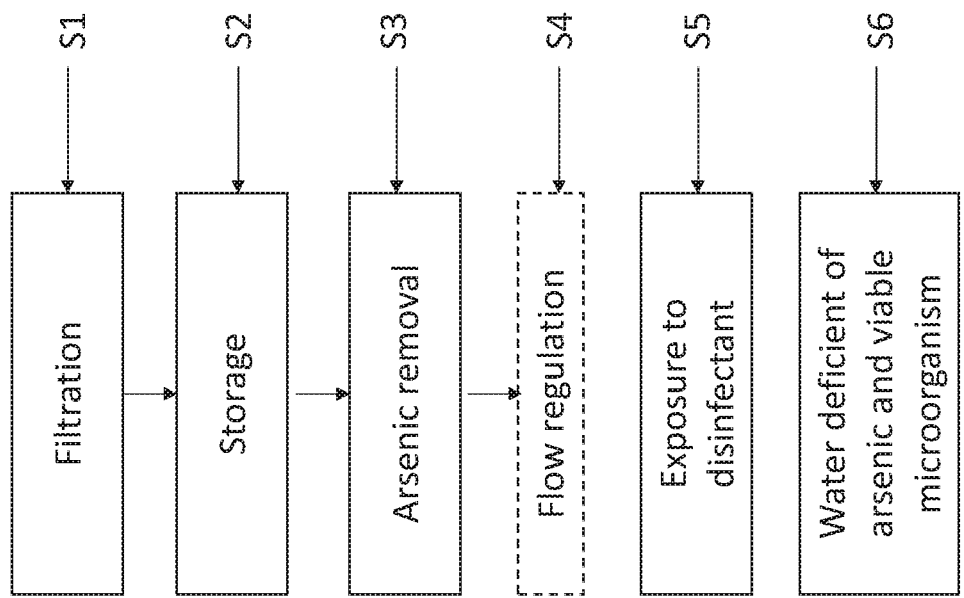
FIG. 1 illustrates a schematic of the process of the present disclosure for water purification.
Figure 3:
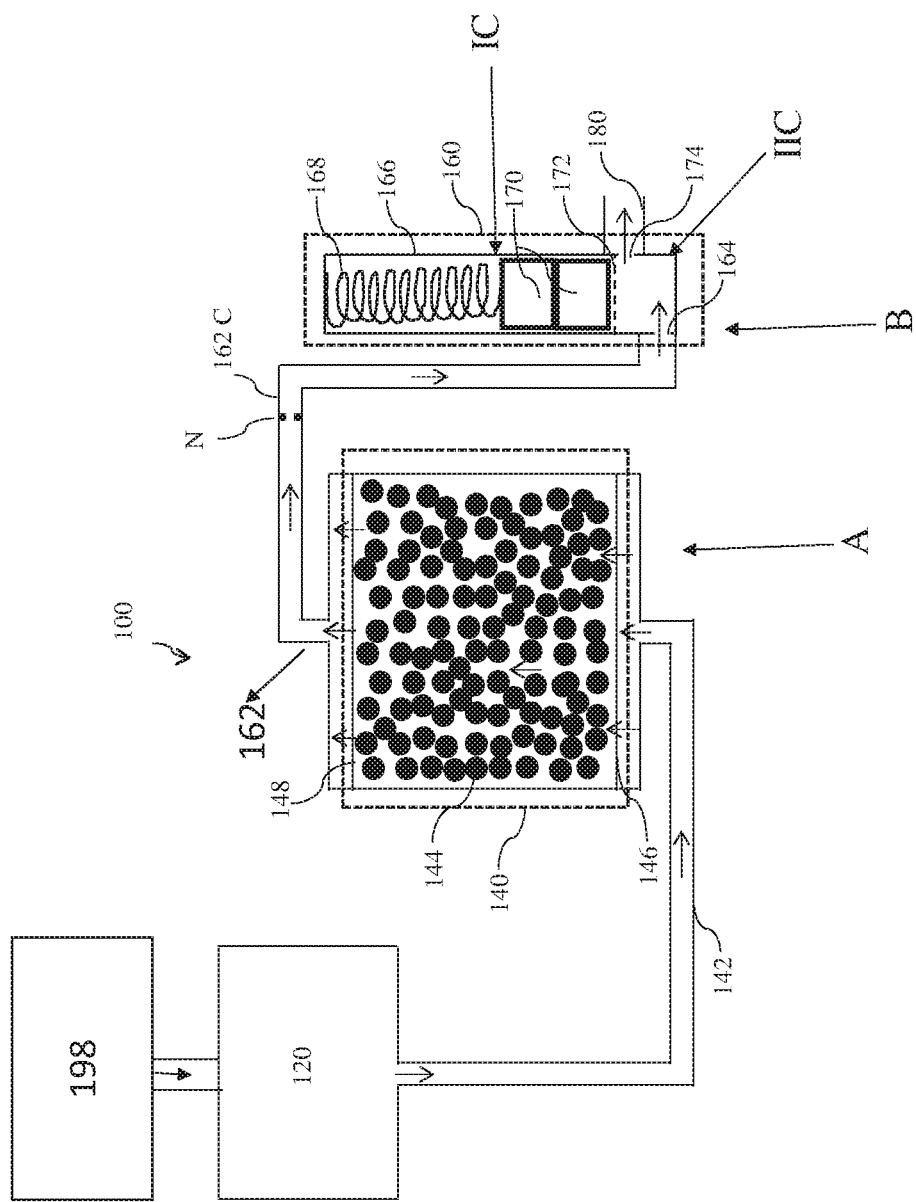
FIG. 3 illustrates the process of the present disclosure (100) for water purification.

The process of the present disclosure is explained by means of FIGS. 1 and 3. The process initially includes removing arsenic from the water laden with arsenic and microorganisms. Removal of arsenic is achieved by leading the water, against gravity, through a bed of granulated arsenic removal media (140) for a time period ranging from 5 to 30 minutes. This residence time of the water laden with arsenic and microorganisms in the granulated bed is critical for the efficient removal of arsenic. A nozzle (N) is, therefore, optionally used to regulate the residence time.

Figure 2:
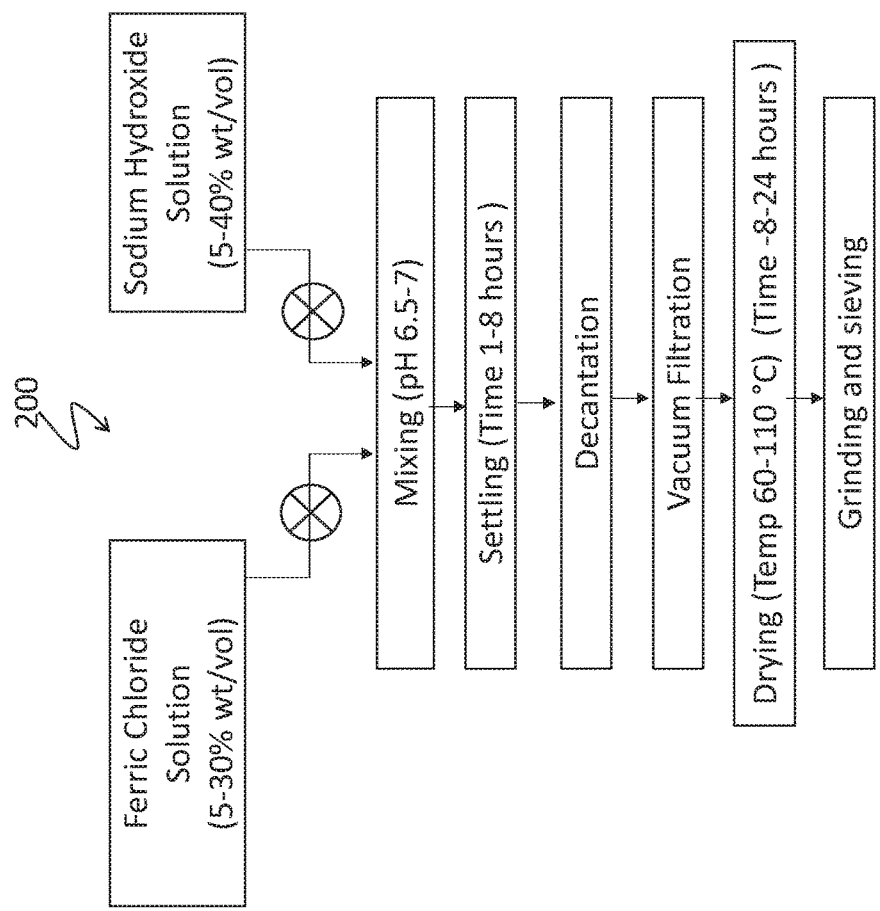
FIG. 2 illustrates the process (200) for the preparation of arsenic adsorbent media.

The arsenic removal media (144) is prepared by a characteristic process that yields the adsorption media granules in a particular size and surface area which further ensures efficient removal of arsenic from the water. The process for the preparation of the arsenic removal media (144) is described in FIG. 2. Typically, the arsenic removal media is prepared by a process presented hereinafter. In the first step, a 5 to 30% wt/vol solution of ferric chloride and a 5 to 40% wt/vol solution of sodium hydroxide are added simultaneously in water accompanied by continuous mixing by a stirrer and maintaining the pH of the solution in the range of 6.5 to 7. Maintaining pH in this range yields an arsenic adsorption media of optimum capacity and strength. After adequate mixing of the ferric chloride and sodium hydroxide solutions, the slurry is allowed to settle for a time period sufficient so that a clear supernatant is formed. According to one embodiment of the present subject matter the settling time is in the range of 1 to 8 hours. The supernatant is then decanted leaving behind thick slurry. The thick slurry is then vacuum filtered to obtain a filtration cake which is then dried in an oven at a temperature in the range of 60 to 110° C. for a time period of 8 to 24 hours. The dried filter cake is then ground using a suitable method such as crushing, milling etc. and then sieved to obtain the particles of desired size. The granulated media of the present disclosure has particle size ranging from 400 to 1000 micrometers and surface area ranging from 50 to 400 m2/g.

The thus prepared adsorbent media (144) is then held in between a coarse mesh (146) and a cloth (148) to obtain the granulated arsenic removal media bed (140), through which the water laden with arsenic and microorganisms is passed. The bed therefore comprises iron compounds that are the reaction products of ferric chloride and sodium hydroxide and consist of iron oxides, iron hydroxides and ironoxyhydroxides. Typically, the iron compound is at least one selected from the group consisting of ferric hydroxide and ferrous hydroxide. The arsenic removal media consists of iron compounds in an amount ranging from 30 to 70% of the total mass of the bed.

As the name suggests, the role of the media (144) is to adsorb the arsenic present in the water. The anionic arsenic species normally present in ground water are said to get adsorbed on the media by forming surface complexes with the cationic iron compounds. The extent of adsorption depends on the surface area of the media and the contact time between the arsenic laden water and the adsorption media. Thus, after passing through the bed of granulated arsenic removal media (140), water with reduced arsenic content is obtained.

Subsequently, viable microorganisms present in the water with reduced arsenic content are removed by leading this arsenic deficient water through a disinfectant releasing system. The disinfectant releasing system of the present disclosure releases at least one disinfectant in the water with reduced arsenic content to inactivate the viable microorganisms. The disinfectant releasing system of the present disclosure is prepared by mounting at least one spring (168) loaded disinfectant releasing tablet (170) in a chamber where the said disinfectant releasing tablet (170) is biased in a first compartment (IC) against a diffusion barrier (172) to release the fluidized disinfectant(s) into the water with reduced arsenic content which is passing through a second compartment (IIC).

The disinfectant releasing tablet (170) comprises at least one disinfectant releasing compound in an amount ranging from 50 to 100% of the total mass of the tablet and at least one additive in an amount ranging from 0 to 50% of the total mass of the tablet. Typically, the rate of release of the disinfectant in the water ranges from 0.1 to 1 mg/liter. The disinfectant of the present disclosure is chlorine.

The disinfectant releasing compound is selected from the group consisting of calcium hypochlorite, sodium dichloroisocyanurate, trichloroisocyanuric acid and N-chloro-p-toluenesulfonamide sodium salt (Chloramine T); whereas the additive is selected from the group consisting of vehicle, buffer, diluent, binder, glidant, lubricant, disintegrant, wetting agent, stabilizer, flavoring agent, sweetening agent, coating agent, preservative, dispersing agent, oil, wax, emulsifier, surfactant, gelling agent, opacifier, humectant, antioxidant, suspending agent, thickening agent, antifoaming agent and adsorbent, in an amount ranging from 0 to 50% of the total mass of the tablet. The additive is at least one selected from the group consisting of calcium sulfate, magnesium sulfate, starch, lactose, sucrose, cellulose, silica, sodium stearate, magnesium stearate and stearic acid.

Chlorine released by the disinfectant releasing system inactivates the viable microorganisms present in the water to provide water deficient of arsenic and viable microorganisms.

The water laden with arsenic and microorganisms is optionally subjected to filtration in a filtration unit (198) in order to remove contaminants other than microorganisms and arsenic. The arsenic adsorption system and the disinfectant releasing system when used in conjunction have the capacity of purifying about 2000 liters of water. After this threshold is reached, the adsorption media and the disinfectant system need to be replaced and/or rejuvenated. Therefore, the present process further includes the step of monitoring the volume of purified water given out in order to have an indication of its remaining life before replacement.

A schematic of the process of the present disclosure is briefly described by means of FIG. 1 where the 6 stages of water purification have been illustrated. The first optional stage of filtration is represented by S1. The filtered water may be stored in a reservoir S2 following which it is subjected to arsenic removal—stage 3 (S3). The arsenic deficient water after passing through a flow regulator S4, is passed on to the disinfectant releasing system where reduction in the viable microbial load is achieved as the water is exposed to at least one disinfectant S5. The water with a reduced viable microbial and arsenic load is, thus, obtained S6.

Figure 4:
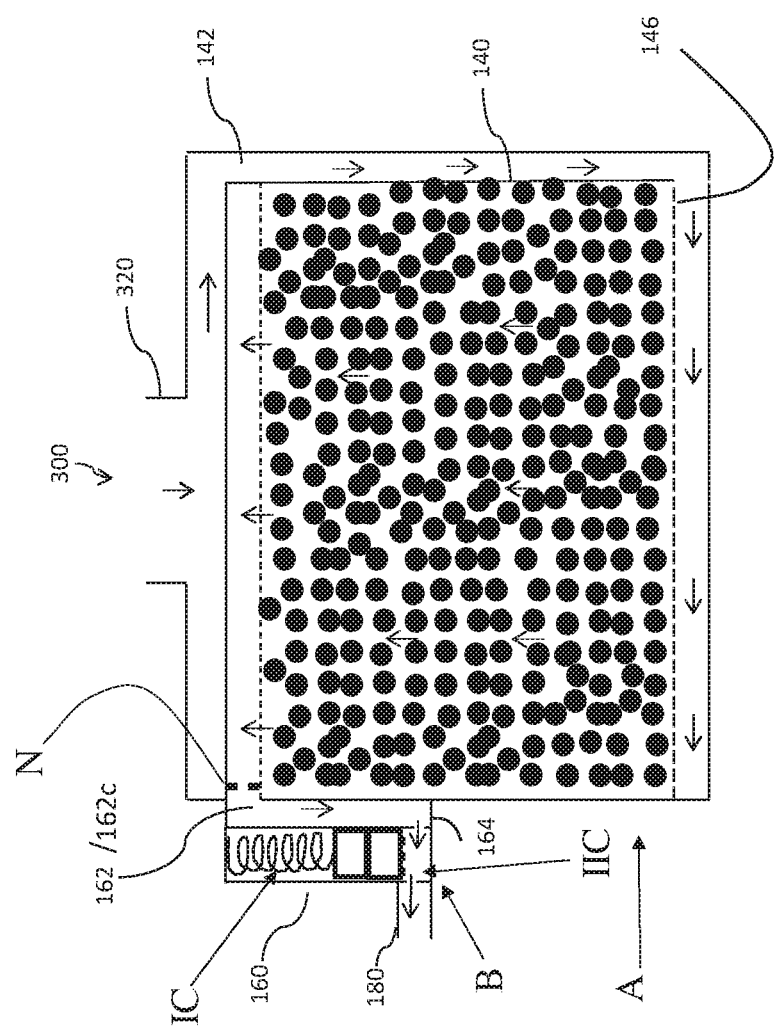
FIG. 4 illustrates an apparatus (300) for water purification based on the process of the present disclosure

The present disclosure further provides an apparatus (300) for removing arsenic and inactivating microorganisms from arsenic and microorganisms laden water. The apparatus of the present disclosure (300) is represented in FIG. 4, wherein the apparatus broadly includes a first chamber (A) and a second chamber (B). Upon passing through the first chamber, arsenic is removed from the arsenic and microorganisms laden water. Further, upon passing through the second chamber, microorganisms from the arsenic deficient water are inactivated to finally yield water without both arsenic and viable microorganisms.

According to the present process, water laden with arsenic and microorganisms is first, optionally, subjected to filtration in a filtration unit (198) in order to remove impurities other than arsenic and microorganisms. The filtered water is then stored in a reservoir (120). Water contained in the reservoir enters the first chamber (A) through a first inlet (142). The water laden with arsenic and microorganisms is made to pass, against gravity, through a bed of granulated arsenic removal media (140) via a coarse mesh (146). The bed of granulated arsenic removal media (140) adsorbs arsenic contained in the water to obtain water with reduced arsenic content. The bed typically contains iron compounds in an amount ranging from 30 to 70% of the total mass of the bed. Further, the granulated media (144) has particle size ranging from 400 to 1000 micrometers and surface area ranging from 50 to 400 m2/g.

The water with reduced arsenic content is then passed through a cloth (148) which is adapted to trap fine suspended particles in the water with reduced arsenic content and fine particles of said media generated due to breakage during the flow of the water through said media. The resultant water is then passed through a first outlet (162) to reach a second inlet (164) of the second chamber (B) via a conduit (162c). The coarse mesh (146) has a mesh size ranging from 20 mesh (841 micrometer) to 60 mesh (250 micrometer) and the cloth has a pore size ranging from 3 micrometer to 20 micrometers. The coarse mesh and the cloth are made up of at least one material selected from the group consisting of natural fibers, synthetic fibers, synthetic polymers, woven fabrics and non-woven fabrics. Further, the coarse mesh and the cloth are made up of at least one material selected from the group consisting of felt, nylon, polypropylene, polyamide and polyester. Further, the coarse mesh is made up of at least one material selected from the group consisting of plastic and metals.

A conduit (162c) is present to communicate liquid from the first outlet (162) to the second inlet (164). The conduit optionally includes at least one nozzle (N) for regulating the contact time between said arsenic and microorganisms laden water and said bed of granulated arsenic removal media.

The second chamber (B) of the present disclosure broadly includes a first compartment (IC) and a second compartment (IIC) such that the first compartment is located above the second compartment and the first and the second compartment are separated by a diffusion barrier (172). The second chamber (B) includes a second inlet (164) provided to the second compartment which receives the water with reduced arsenic content. This incoming water is exposed to at least one disinfectant released by at least one disinfectant releasing tablet (170) present in the first compartment to inhibit the microorganisms present in the water. In one embodiment, the disinfectant of the present disclosure is chlorine.

The life of disinfectant releasing tablets (170) is matched with the life of the arsenic removal media (144) and hence the disinfectant releasing tablets (170) indicate the remaining life of the arsenic removal media (144). Typically, the remaining life of the arsenic removal media can be indicated by the dimensions of the disinfectant releasing tablets. In one embodiment the dimension of the tablet is one of the height and diameter of the tablet.

The second chamber (B) also includes a diffusion barrier (172) adapted to regulate the diffusion and therefore, the concentration of the released disinfectant in the water with reduced arsenic content. The diffusion barrier is a porous material adapted to permit passage of water and gas there through. The diffusion barrier is made up of at least one material selected from the group consisting of natural fibers, synthetic fibers, synthetic polymers, woven fabrics, non-woven fabrics. Further, the diffusion barrier is made up of at least one material selected from the group consisting of felt, nylon, polypropylene, polyamide and polyester. The chamber further includes at least one spring (168) located in the first compartment adapted to maintain contact of the tablet(s) (170) with the diffusion barrier (172). The spring is made up of at least one material selected from the group consisting of plastic and plastic coated metal. A second outlet (180) provided to the second compartment is further present to receive the water deficient of arsenic and viable microorganisms.

In the apparatus (300) of the present disclosure (FIG. 4), the bed of arsenic removal media (140) and disinfectant releasing system (160) may be integrated in the form of a compact cartridge which can be attached to a water storage container to receive water through its opening (320). According to an embodiment of the present subject matter, the compact cartridge is in the form of cylindrical container with a pipe (142) attached on its side for flow of contaminated water to the bottom of the bed of arsenic removal media (140) and another pipe or a conduit (162) for flow of output water from bed of arsenic removal media (140) to the disinfectant releasing system (160). The compact apparatus (300) has an outlet (180) for exit of purified water.

Figure 5:
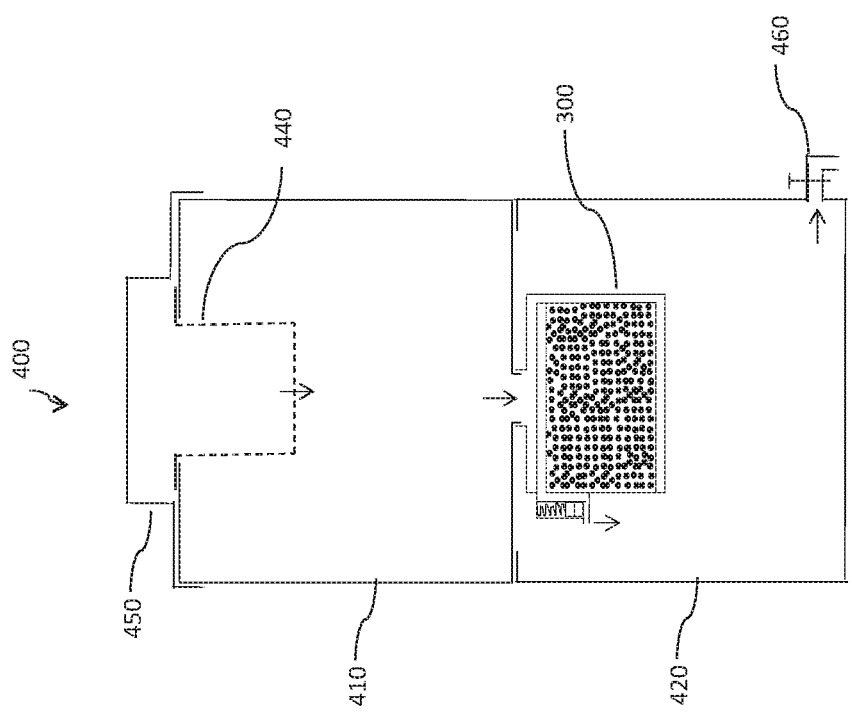
FIG. 5 illustrates a point of use (POU) (400) system for water purification based on the apparatus of the present disclosure.

Further, the process and apparatus of the present disclosure can be integrated in the form of a point of use (POU) system as represented in FIG. 5 where a source reservoir (410) for collection of contaminated water, pre-filtration unit (440) for removal suspended particles, an apparatus (300) for removal of microbial and arsenic contamination present in the water, a collection reservoir (420) for storing purified water, a lid (450) for covering the pre-filtration unit (440) and a tap (460) for withdrawing purified water from the collection reservoir (420) are demonstrated.

Figure 6:
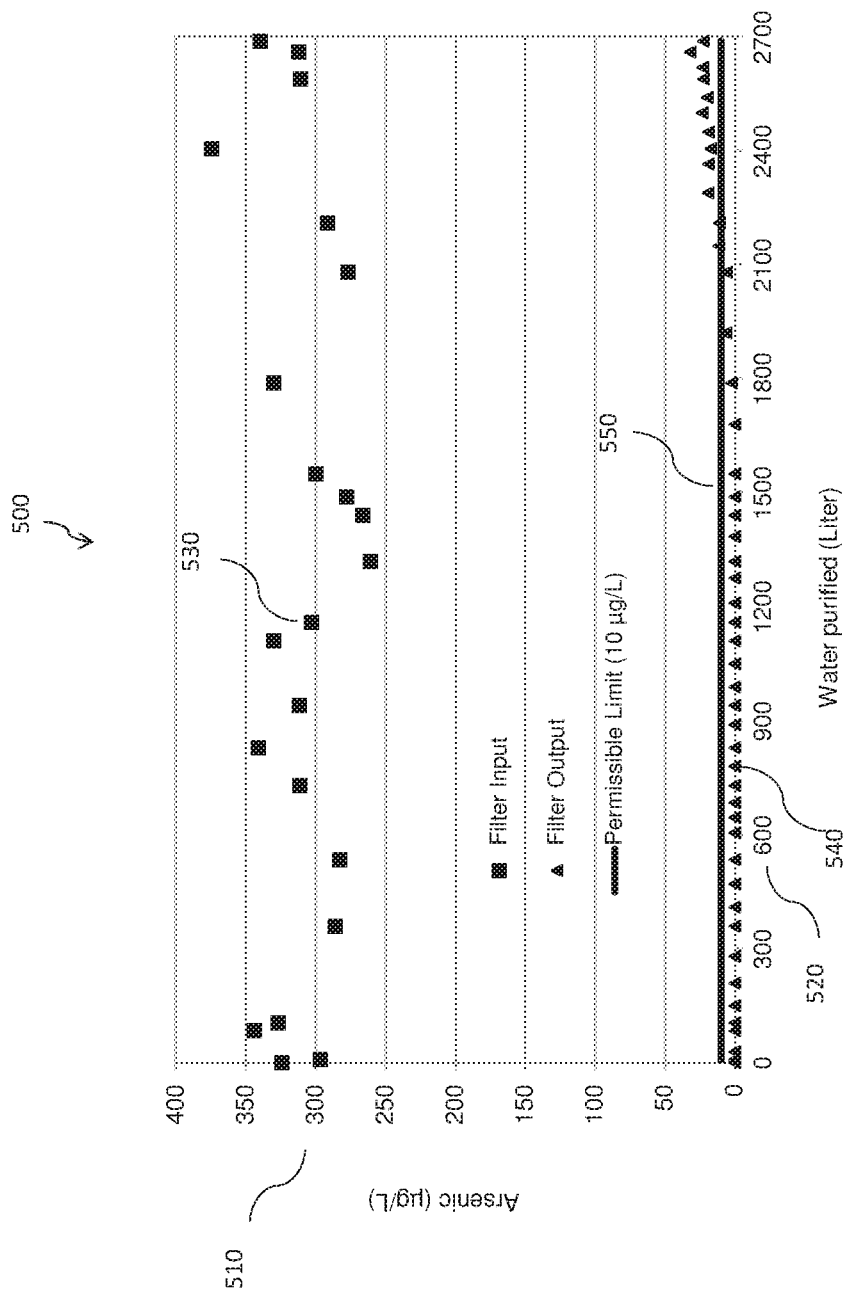
FIG. 6 is a graph (500) demonstrating the arsenic removal performance of the process and apparatus of the present disclosure.

The present disclosure will now be discussed in the light of the following non-limiting embodiments:

Example 1: Process for Water Purification According to the Present Disclosure with an Analysis of the Arsenic Removal Performance The bed of arsenic removal media was prepared by using 378 gram of arsenic removal media in the form of a cartridge of 880 milliliter in size. The arsenic removal media was prepared by simultaneous addition of 20% wt/vol solution of ferric chloride and a 14% wt/vol solution of sodium hydroxide in water while continuous mixing it by a stirrer and maintaining the pH of the solution to 6.8. The slurry was allowed to settle for 8 hours and the supernatant was removed first by decantation and then by vacuum filtration. The filter cake was dried in an oven at a temperature of 65° C. for a time period of 24 hours and the dried cake was granulated to obtain particles passing through 850 micrometer size sieve and retaining on 425 micrometer size sieve. In order to test the arsenic removal performance, the cartridge was connected to a source reservoir of point of use (POU) system containing source reservoir for storage of arsenic contaminated water and collection reservoir for collection of purified water from cartridge. Ground water spiked with arsenic was filled in the source reservoir and the purified water was collected from the tap of the collection reservoir. The flow through the cartridge was controlled at 3 liter per hour so that the arsenic spiked water resided in the bed of arsenic removal media for contact time of 12 minutes. Water samples were collected from the source reservoir and the tap of the collection reservoir at different intervals during the life of the cartridge and analyzed for arsenic content using atomic absorption spectrophotometer with hydride generation assembly. FIG. 6 displays a graph 500 showing the arsenic removal performance of the present process for purification of water. In graph 500, the concentration of arsenic in water in micrograms per liter was taken as the first reference and is depicted on the vertical axis (y) of the graph 500 and volume of water purified in liters was taken as the second reference and is depicted in the horizontal axis (x). Data points (a) may be considered to form a notional curve that shows concentration of arsenic contamination in the source reservoir 410. Data points (b) may similarly form another curve that shows the concentration of arsenic in the purified water collected from the tap 460 of collection reservoir 420. Line (c) shows the permissible limit for concentration of arsenic contamination in drinking water set by Indian and the WHO standard bodies. As seen in graph 500, the process for purification of water 100 results in purification of more than 2000 liters of water with an output arsenic concentration which is below the limit set by the Indian and WHO standard bodies. This also indicates that the life of the POU system of the present disclosure is about 2000 liters. After this limit is reached, the cartridge may be discarded and replaced by a new one.

Example 2: Process for Water Purification According to the Present Disclosure with an Analysis of the Performance for Reduction in the Microbial Load In order to test the performance of the process for purification of water, for bacteria and virus reduction, a cartridge was prepared similar to that described in Example 1, with a chlorine releasing system prepared by using two tablets of trichloroisocyanuric acid held between diffusion barrier and spring in a casing with inlet and outlet holes. Chlorine releasing tablet was prepared by using 1.5 gram of trichloroisocyanuric acid while the diffusion barrier was prepared using felt cloth. The water from the bed of arsenic removal media entered the disinfectant releasing system and made an exit while making contact with the diffusion barrier. The cartridge containing a bed of arsenic removal media and chlorine releasing system was attached to the source reservoir of the POU system and tested against ground water spiked with bacteria and virus. To determine the bacteria reduction performance, ground water spiked with *Escherichia coli* (*E. coli*) ATCC 11229, a test strain suggested by WHO for evaluating household water treatment technologies (WHO, February 2014, Harmonized Testing Protocol: Technology Non-Specific, Geneva, Switzerland) was used. The bacteria reduction performance of cartridge based on the process for purification of water was checked at six stages during its operational life viz. at 46, 120, 300, 660, 1615 and 2285 liters and the results are given in Table 1. The input bacterial load in the source reservoir was in the range of $2.5 \times 10^6$ to $7.11 \times 10^6$ colony forming units per milliliter (CFU/ml) and the output bacterial concentration in the purified water in the collection reservoir was in the range of 0 to 65 CFU/ml giving a log 10 reduction in the range of 5.03 to 6.7. Hence, the bacteria reduction achieved by the present process is more than the bacteria reduction requirement of 4 log 10 set by the WHO for evaluating household water treatment technologies under the category of highly protective technologies (WHO, February 2014, Harmonized Testing Protocol: Technology Non-Specific, Geneva, Switzerland). Similarly, the performance of the process for purification of water 100 against virus is given in Table 2. To accomplish this, ground water spiked with MS-2 coliphage ATCC 15597-B1, *E. coli* host ATCC 15597 a test strain suggested by the WHO for evaluating household water treatment technologies, was used. The performance of cartridge based on the process for purification of water was evaluated at four stages during its operational life viz. 45, 410, 620 and 1935 liters and the results are given in Table 2. The input virus load in the source reservoir was in the range of $6.0 \times 10^5$ to $1.16 \times 10^7$ plaque forming units per milliliter (PFU/ml), the output virus concentration in the purified water in the collection reservoir was in the range of 0 to 18 PFU/ml giving a log 10 reduction in the range of 5.78 to 6.02. Hence, the present process has shown that the reduction of the MS-2 virus is by more than the 5 log 10 reduction requirement set by the WHO for evaluating household water treatment technologies under the category of highly protective technologies (WHO, 2014).

TABLE 1

Bacteria reduction performance of the process of the present disclosure

| Water Purified (Liter) | Input bacterial load (CFU/ml) | Output bacterial load (CFU/ml) | Bacteria reduction ($Log_{10}$) | WHO bacteria reduction requirement, for highly protective technology ($Log_{10}$) |
|---|---|---|---|---|
| 46 | $7.11 \times 10^6$ | 65 | 5.03 | 4 |
| 120 | $4.70 \times 10^6$ | 1 | 6.37 | 4 |
| 300 | $4.09 \times 10^6$ | 18 | 5.33 | 4 |
| 660 | $2.50 \times 10^6$ | 3 | 5.80 | 4 |
| 1615 | $5.00 \times 10^6$ | 0 | 6.70 | 4 |
| 2285 | $2.85 \times 10^6$ | 0 | 6.45 | 4 |

CFU: Colony forming unit

TABLE 2

Virus reduction performance of the process of the present disclosure

| Water Purified (Liter) | Input virus load (PFU/ml) | Output virus load (PFU/ml) | Virus reduction ($Log_{10}$) | WHO virus reduction requirement for highly protective technology ($Log_{10}$) |
|---|---|---|---|---|
| 45 | $1.05 \times 10^6$ | 0 | 6.02 | 5 |
| 410 | $6.00 \times 10^5$ | 0 | 5.78 | 5 |
| 620 | $1.04 \times 10^6$ | 0 | 6.02 | 5 |
| 1935 | $1.16 \times 10^7$ | 18 | 5.80 | 5 |

PFU: Plaque forming unit

From the examples, it can be inferred that the process for purification of water of the present disclosure has been shown to remove arsenic, bacteria and virus contamination from water. Further, the process reduces the arsenic contamination while meeting the requirements of the Indian and WHO standards. Even further, the extent of reduction in the viable bacteria and virus content achieved by the present process, is more than that stated as the minimum requirement of reduction; thereby proving the efficiency of the process of the present disclosure.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There are a number of advantages of the process and the apparatus for the purification of water of the present disclosure over the conventional methods, such as: (i) The process for purification of water of the present disclosure simultaneously reduces both arsenic and microbial contamination in the water. (ii) The process for purification of water of the present disclosure efficiently reduces the arsenic below the maximum permissible limit and microbial content above the $\log_{10}$ reduction requirement set by World Health Organization (WHO, 2014). (iii) The process for purification of water of the present disclosure is cost-effective and easy to install. (iv) The process for purification of water of the present disclosure can be readily used in water storage container and in a point of use purifier. (v) The process for purification of water of the present disclosure is substantially exclusive of electricity. (vi) The process for purification of water of the present disclosure does not require continuous supply of water. (vi) The process for purification of water of the present disclosure does not require skilled manpower for its operation. (vii) The process for purification of water of the present disclosure does not cause any aesthetic alteration in the water. The chemicals leached in the water such as iron from arsenic reduction system and disinfectant from microbicidal system are within their permissible limits, hence do not alter the taste and odor of water.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A process for removing arsenic and inactivating microorganisms from arsenic and microorganisms laden water in a point of use water purification system;
said process comprising:
preparing granulated arsenic removal media (144) by:
adding ferric chloride in an amount ranging from 5 to 30% weight/volume and sodium hydroxide in an amount ranging from 5 to 40% weight/volume in water, at a pH ranging from 6.5 to 7 to obtain a slurry;
allowing said slurry to settle for a time period ranging from 1 to 8 hours to obtain a residue and a supernatant;
separating said supernatant from said residue by decantation and filtration to obtain a cake;
drying said cake at a temperature ranging from 60 to 110° C. for a time period ranging from 8 to 24 hours to obtain a dried cake;
converting said dried cake to granulated matter, the granulated matter represents the granulated arsenic removal media (144); and
preparing a bed of granulated arsenic removal media (140) by holding the granulated arsenic removal media (144) between a mesh and a cloth, and
removing arsenic from the arsenic and microorganisms laden water by leading a flow of the arsenic and microorganisms laden water, against gravity, through the bed of granulated arsenic removal media (140) to produce a flow of microorganisms laden water with reduced arsenic content, wherein the bed of granulated arsenic removal media (140) comprises iron compounds in an amount ranging from 30 to 70% of the total mass of the bed, the granulated arsenic removal media (144) having particle size ranging from 400 to 1000 micrometers and surface area ranging from 50 to 400 $m^2/g$, and
regulating a contact time between said arsenic and microorganisms laden water and said bed of granulated arsenic removal media (140) by regulating the flow of microorganisms laden water with reduced arsenic content, with a nozzle (N), the contact time ranging from 5 to 30 minutes; and
inactivating microorganisms in the water laden with microorganisms with reduced arsenic content by leading the water laden with microorganisms with reduced arsenic content through a disinfectant releasing system which releases at least one disinfectant in the water laden with microorganisms with reduced arsenic content at a rate ranging from 0.1 to 1 mg/liter to cause depletion of viable microbial content therein, to provide water deficient of arsenic and microorganisms, wherein said disinfectant is chlorine, wherein the point of use water purification system does not need electricity and continuous supply of water for performing the process of removing arsenic and inactivating microorganisms from the arsenic and microorganisms laden water.

2. The process according to claim 1 wherein the process for preparation of said granulated arsenic removal media (144) comprises sieving said granulated matter to obtain the sized granulated arsenic removal media (144) having particle size ranging from 400 to 1000 micrometers and surface area ranging from 50 to 400 m2/g.

3. The process according to claim 2, wherein ferric chloride and sodium hydroxide are added in water simultaneously.

4. The process according to claim 1, wherein said iron compounds include iron oxide, iron hydroxide and iron-oxy hydroxide.

5. The process according to claim 1, wherein said disinfectant releasing system comprises at least one spring (168) mounted with loaded disinfectant releasing tablet (170) in a chamber, wherein said disinfectant releasing tablet (170) is biased in a first compartment (IC) against a diffusion barrier (172) to release at least one fluidized disinfectant into the water with reduced arsenic content passing through a second compartment (IIC).

6. The process according to claim 5, wherein said disinfectant releasing tablet (172) comprises at least one disinfectant releasing compound selected from the group consisting of calcium hypochlorite, sodium dichloroisocyanurate, trichloroisocyanuric acid and N-chloro-p-toluenesulfonamide sodium salt (Chloramine T), in an amount ranging from 50 to 100% of the total mass of the tablet and at least one additive selected from the group consisting of vehicle, buffer, diluent, binder, glidant, lubricant, disintegrant, wetting agent, stabilizer, flavoring agent, sweetening agent, coating agent, preservative, dispersing agent, oil, wax, emulsifier, surfactant, gelling agent, opacifier, humectant, antioxidant, suspending agent, thickening agent, antifoaming agent and adsorbent, in an amount ranging from 0 to 50% of the total mass of the tablet.

7. The process according to claim 1, further comprising the step of leading the arsenic and microorganisms laden water through a filtration unit (198) before leading said water through the bed of granulated arsenic removal media (140).

8. The process according to claim 1, includes the step of monitoring a volume of the water deficient of arsenic and microorganisms.

9. An apparatus (300) for removing arsenic and inactivating microorganisms from arsenic and microorganisms laden water; said apparatus (300) comprising:
- a first chamber (A) comprising:
  - a first inlet (142) adapted to receive said arsenic and microorganisms laden water;
  - a coarse mesh (146), having mesh size ranging from 20 mesh (841 micrometer) to 60 mesh (250 micrometer), adapted to permit the passage of said water received from said first inlet (142) there through;
  - a bed of granulated arsenic removal media (140) supported by said coarse mesh (146) adapted to allow the passage of said arsenic and microorganisms laden water against gravity, and adsorb the arsenic present in said water to obtain a flow of microorganism laden water with reduced arsenic content, wherein the granulated arsenic removal media (144) is prepared by:
    - adding ferric chloride in an amount ranging from 5 to 30% weight/volume and sodium hydroxide in an amount ranging from 5 to 40% weight/volume in water, at a pH ranging from 6.5 to 7 to obtain a slurry;
    - allowing said slurry to settle for a time period ranging from 1 to 8 hours to obtain a residue and a supernatant;
    - separating said supernatant from said residue by decantation and filtration to obtain a cake;
    - drying said cake at a temperature ranging from 60 to 110° C. for a time period ranging from 8 to 24 hours to obtain a dried cake;
    - converting said dried cake to granulated matter, the granulated matter represents the granulated arsenic removal media (144); and wherein the bed of granulated arsenic removal media (140) comprises iron compounds in an amount ranging from 30 to 70% of the total mass of the bed, the granulated arsenic removal media (144) having particle size ranging from 400 to 1000 micrometers and surface area ranging from 50 to 400 $m^2/g$;
  - a first outlet (162) adapted to receive the flow of microorganism laden water with reduced arsenic content; and
  - a cloth (148), having pore size ranging from 3 micrometer to 20 micrometer, fitted operatively over said bed of granulated arsenic removal media (140) and between said bed of granulated arsenic removal media (140) and said first outlet (162) adapted to trap fine particles in the water with reduced arsenic content and permit passage of the microorganism laden water with reduced arsenic content there through to said first outlet (162);
- a second chamber (B) comprising a first compartment (IC) and a second compartment (IIC) operatively separated from said first compartment by a diffusion barrier (172), said first compartment being located operatively over the second compartment; said second chamber (B) comprising:
  - a second inlet (164) provided to said second compartment adapted to receive the microorganism laden water with reduced arsenic content from said first outlet (162);
  - at least one disinfectant releasing tablet (170) provided in said first compartment adapted to release at least one disinfectant when moistened;
  - a diffusion barrier (172) adapted to regulate the diffusion of the released disinfectant;
  - at least one spring (168) provided in the first compartment adapted to bias said tablet(s) (170) against said diffusion barrier (172); and
  - a second outlet (180) provided to said second compartment adapted to exit the water deficient of arsenic and microorganisms; and
- a conduit (162c) configured to communicate from said first outlet (162) to said second inlet (164), comprising at least one nozzle (N) for regulating a contact time between said arsenic and microorganisms laden water and said bed of granulated arsenic removal media (140) by regulating the flow of microorganism laden water with reduced arsenic content, the contact time ranging from 5 to 30 minutes.

10. The apparatus according to claim 9, further includes at least one filtration unit (198) connected upstream of the first inlet.

11. The apparatus according to claim 9, further includes a life indicator to display remaining life of the granulated arsenic removal media (144).

12. The apparatus according to claim 11, wherein at least one dimension of the disinfectant releasing tablet(s) (170) is used to indicate remaining working life of the apparatus (300).

* * * * *